(12) United States Patent
Kim et al.

(10) Patent No.: US 8,212,969 B2
(45) Date of Patent: Jul. 3, 2012

(54) METHOD AND APPARATUS FOR MANUFACTURING DISPLAY DEVICE

(75) Inventors: Sung-Woon Kim, Suwon-si (KR); Kyung-Ho Jung, Seoul (KR); Hee-Seop Kim, Hwaseong-si (KR); Hae-Young Yun, Suwon-si (KR); Jiangang Lu, Suwon-si (KR); Seung-Hoon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 388 days.

(21) Appl. No.: 12/498,158

(22) Filed: Jul. 6, 2009

(65) Prior Publication Data
US 2010/0026993 A1 Feb. 4, 2010

(30) Foreign Application Priority Data
Aug. 1, 2008 (KR) .................. 10-2008-0075693

(51) Int. Cl.
*G02F 1/1335* (2006.01)
(52) U.S. Cl. .................. 349/95; 349/187; 349/65
(58) Field of Classification Search .............. 349/95, 349/187, 15, 65; 356/124, 401
See application file for complete search history.

(56) References Cited

U.S. PATENT DOCUMENTS

| | | | | |
|---|---|---|---|---|
| 5,554,251 | A * | 9/1996 | Watanabe et al. | 156/379.8 |
| 6,046,787 | A * | 4/2000 | Nishiguchi | 349/129 |
| 6,204,895 | B1 * | 3/2001 | Nakamura et al. | 349/5 |
| 6,502,324 | B2 * | 1/2003 | Noguchi et al. | 33/623 |

* cited by examiner

*Primary Examiner* — Thoi Duong
(74) *Attorney, Agent, or Firm* — H.C. Park & Associates, PLC

(57) ABSTRACT

Provided are a method and apparatus for manufacturing a display device, which can ensure precise alignment and attachment of a lenticular sheet onto a display panel. The method includes sequentially stacking a display panel and a lenticular sheet on a stage, irradiating light that is incident in parallel toward the display panel and the lenticular sheet from below the display panel, detecting the light that has passed through the display panel and the lenticular sheet, and determining an axial direction of a columnar lens formed on the lenticular sheet.

20 Claims, 15 Drawing Sheets

METHOD AND APPARATUS FOR MANUFACTURING DISPLAY DEVICE

CROSS REFERENCE TO RELATED APPLICATION

This application claims priority from and the benefit of Korean Patent Application No. 10-2008-0075693, filed on Aug. 1, 2008, which is hereby incorporated by reference for all purposes as if fully set forth herein.

BACKGROUND OF THE INVENTION

1. Field of the Invention

The present invention relates to a method and apparatus for manufacturing a display device, and more particularly, to a method and apparatus for manufacturing a display device that may be capable of ensuring precise alignment and attachment of a lenticular sheet onto a display panel.

2. Discussion of the Background

As modern society rapidly changes toward an information-oriented one, demand in the market has increased for slimmer and lighter panel displays. The conventional display device, such as a CRT, is not suited to such demand. Accordingly, demand for FPD (Flat Panel Display) devices, such as PDP (Plasma Display Panel) devices, PALC (Plasma Address Liquid Crystal display panel) devices, LCD (Liquid Crystal Display) devices, and OLED (Organic Light Emitting Diode) devices, is rapidly increasing. In particular, demand for display devices having superior display characteristics such as enhanced picture quality, reduced weight, and a slim profile, is rapidly increasing.

Recently, display devices have been developed to display two-dimensional (2D) and three-dimensional (3D) images while providing image quality close to real life. A 3D display uses a difference between the left and right eye views to provide a stereoscopic effect.

Special 3D glasses or holograms may be used to view a 3D stereoscopic image. A display device with a lenticular sheet or barrier can also realize a 3D image.

A lenticular-type display allows a viewer to stereoscopically recognize an object due to a difference between left and right eye views by separating an image produced on a panel into a stereoscopic image by separating a planar image into left-eye and right-eye images so that the left eye sees only the left eye image and the right eye sees only the right eye image.

A lenticular-type display typically requires precise alignment of a lenticular sheet in a display panel. A lenticular sheet may be precisely aligned on a display panel by visual alignment while the display panel is being driven. However, this approach not only requires the use of large-scale equipment but is also difficult to apply to large-size panels.

SUMMARY OF THE INVENTION

The present invention provides a method for manufacturing a display device that may be capable of ensuring precise alignment and attachment of a lenticular sheet onto a display panel.

The present invention also provides an apparatus for manufacturing a display device that may be capable of ensuring precise alignment and attachment of a lenticular sheet onto a display panel.

Additional features of the invention will be set forth in the description which follows, and in part will be apparent from the description, or may be learned by practice of the invention.

The present invention discloses a method for manufacturing a display device which ensures precise alignment and attachment of a lenticular sheet onto a display panel, the method including sequentially stacking a display panel and a lenticular sheet on a stage, irradiating incident light in parallel toward the display panel and the lenticular sheet from below the display panel, detecting the light that has passed through the display panel and the lenticular sheet, and determining an axial direction of a columnar lens formed on the lenticular sheet.

The present invention also discloses an apparatus for manufacturing a display device which ensures precise alignment and attachment of a lenticular sheet onto a display panel, the apparatus including a stage on which a display panel and a lenticular sheet are sequentially seated, a light source unit emitting light in parallel toward the display panel and the lenticular sheet from below the display panel, a detection unit that is disposed above the lenticular sheet and detects the light that has passed through the display panel and the lenticular sheet, and an operation unit receiving data from the detection unit and determining an axial direction of a columnar lens arranged on the lenticular sheet.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
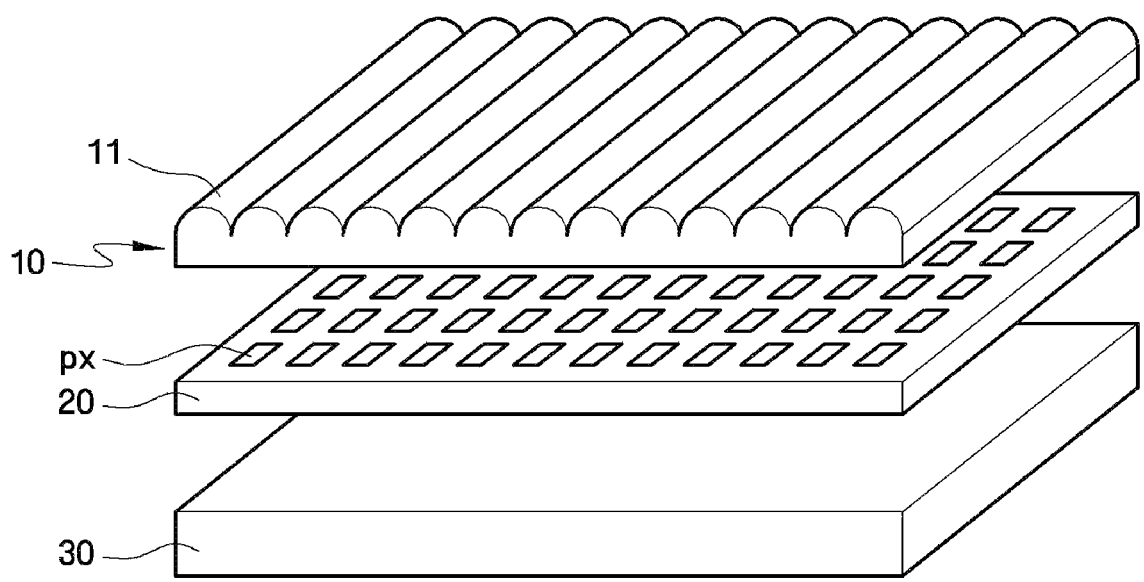
FIG. 1 is a schematic exploded perspective view of a display device manufactured by a manufacturing method according to an exemplary embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element such as a layer, film, region or substrate is referred to as being "on" another element, it can be directly on the other element or intervening elements may also be present. In contrast, when an element is referred to as being "directly on" another element, there are no intervening elements present.

Hereinafter, the configuration of a display device that is fabricated by a manufacturing method according to an exemplary embodiment of the present invention is described in detail with reference to FIG. 1. FIG. 1 is a schematic exploded perspective view of a display device manufactured by a manufacturing method according to an exemplary embodiment of the present invention.

Referring to FIG. 1, a display device 1 according to an exemplary embodiment of the present invention includes a lenticular sheet 10, a display panel 20, and a backlight assembly 30.

The lenticular sheet 10 is designed such that pixels PXs on the display panel 20 may be selectively visible according to a viewer's position, and has a plurality of columnar lenses 11 arranged on a top surface thereof. The plurality of columnar lenses 11 may be arranged perpendicular to or at an angle to a line connecting both eyes of a viewer.

The lenticular sheet 10 is separated from the display panel 20 by a predetermined distance. To achieve this, the lenticular sheet 10 is attached to a base plate (not shown) such as a glass substrate, and a supporter (not shown) is mounted to a rim of the display panel 20 so as to support the lenticular sheet 10. The base plate is not formed separately from the lenticular sheet 10 but has the columnar lenses 11 formed integrally thereon.

The columnar lenses 11 may be concave with respect to the top or bottom surface of the lenticular sheet 10 and extend along a predetermined direction. That is, the columnar lenses 11 referred to herein may have a shape formed by longitudinally cutting a column or elliptic column, but are not limited thereto. For example, the columnar lenses 11 may be multi-focus lenses disposed at different positions or multi-cut lenses.

The display panel 20 displays an image and has a plurality of pixels PXs arranged in a matrix according to a predetermined rule. Each pixel PX that is the smallest unit used to display an image may represent one of red, green, and blue colors. The display panel 20 may be a Plasma Address Liquid Crystal Display Panel (PALCD), a Plasma Display Panel (PDP), an LCD, or an Organic Light Emitting Diode (OLED). For convenience of explanation, the display panel 20 is an LCD.

The backlight assembly 30 is disposed below the display panel 20. More specifically, since the LCD that is a passive display requires a separate light source, the backlight assembly 30 is disposed below the display panel 20 and provides light.

If the backlight assembly 30 provides light to the display panel 20, the display panel 20 displays various images. Images viewed through the lenticular sheet 10 vary depending on a viewer's eye position, thereby providing the viewer with a sense of depth.

Figure 2:
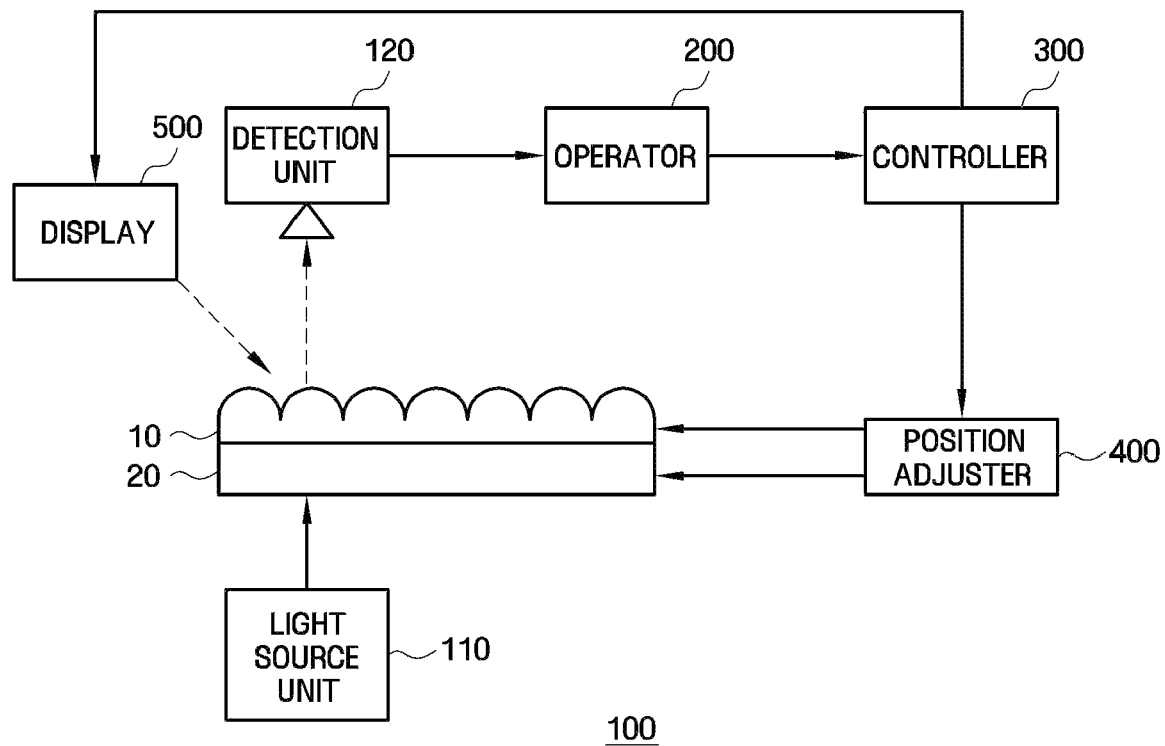
FIG. 2 is a schematic block diagram of a manufacturing apparatus of a display device according to an exemplary embodiment of the present invention.
Figure 5:
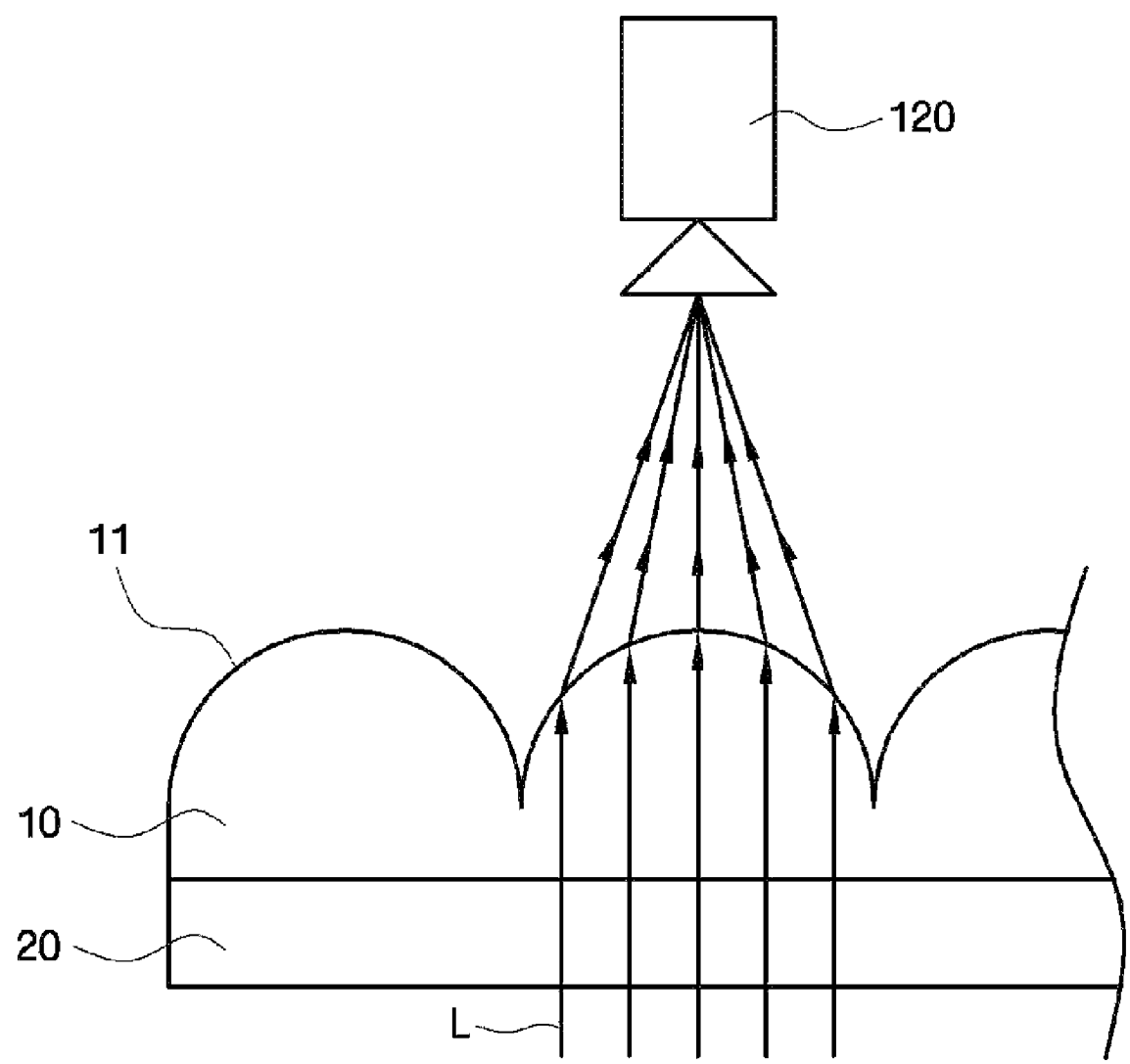
FIG. 5 is a schematic sectional view showing a process of measuring light by the manufacturing apparatus of the display device shown in FIG. 1.
Figure 6:
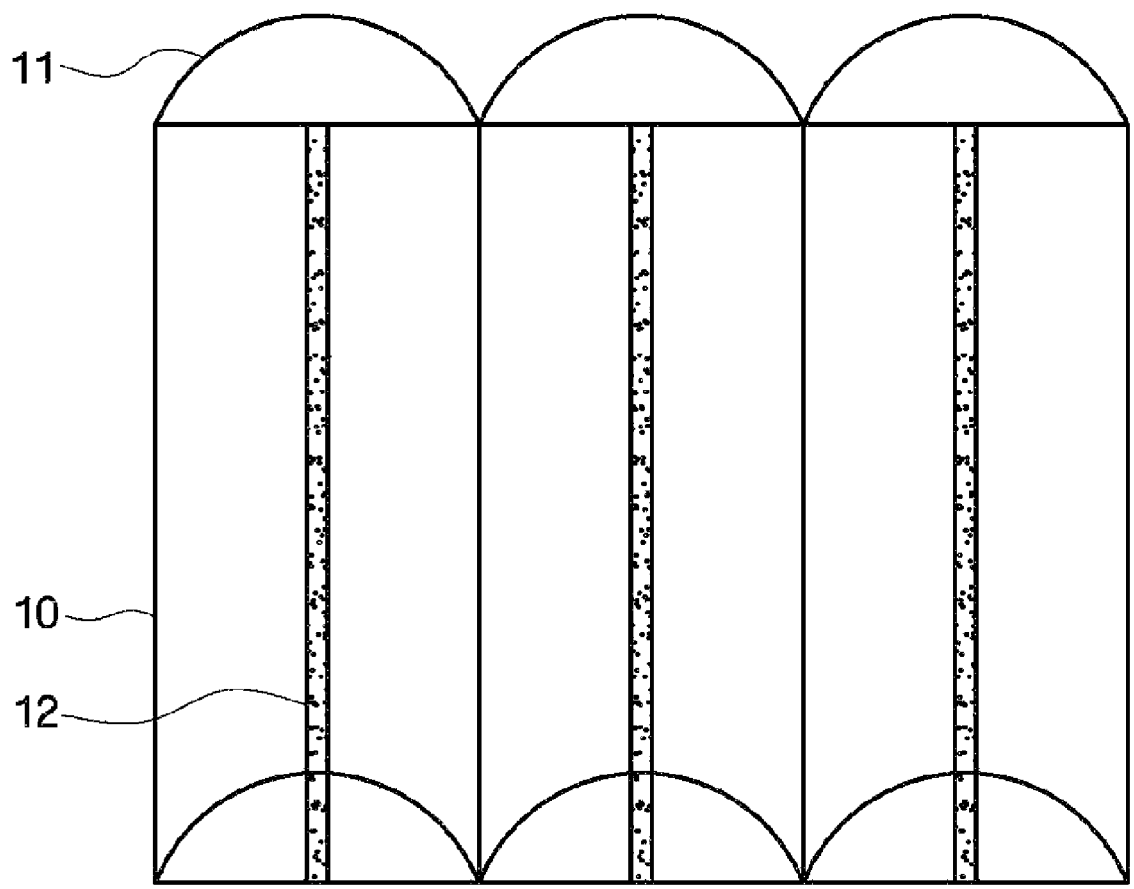
FIG. 6 is a plan view of a lenticular sheet creating a striped image recognized by the detection unit included in the manufacturing apparatus of the display device shown in FIG. 1.

An apparatus 100 for manufacturing a display device according to an exemplary embodiment of the present invention will now be described in detail with reference to FIG. 2, FIG. 3, FIG. 4, FIG. 5, and FIG. 6. FIG. 2 is a schematic block diagram of a manufacturing apparatus of a display device according to an exemplary embodiment of the present invention, FIG. 3 is a perspective view showing positions of a light source unit and a detection unit of the manufacturing apparatus of the display device shown in FIG. 1, FIG. 4 is a plan view showing how the light source unit is disposed in the manufacturing apparatus of the display device shown in FIG. 1, FIG. 5 is a schematic sectional view showing a process of measuring light by the manufacturing apparatus of the display device shown in FIG. 1, and FIG. 6 is a plan view of a lenticular sheet creating a striped image recognized by the detection unit included in the manufacturing apparatus of the display device shown in FIG. 1.

Figure 3:
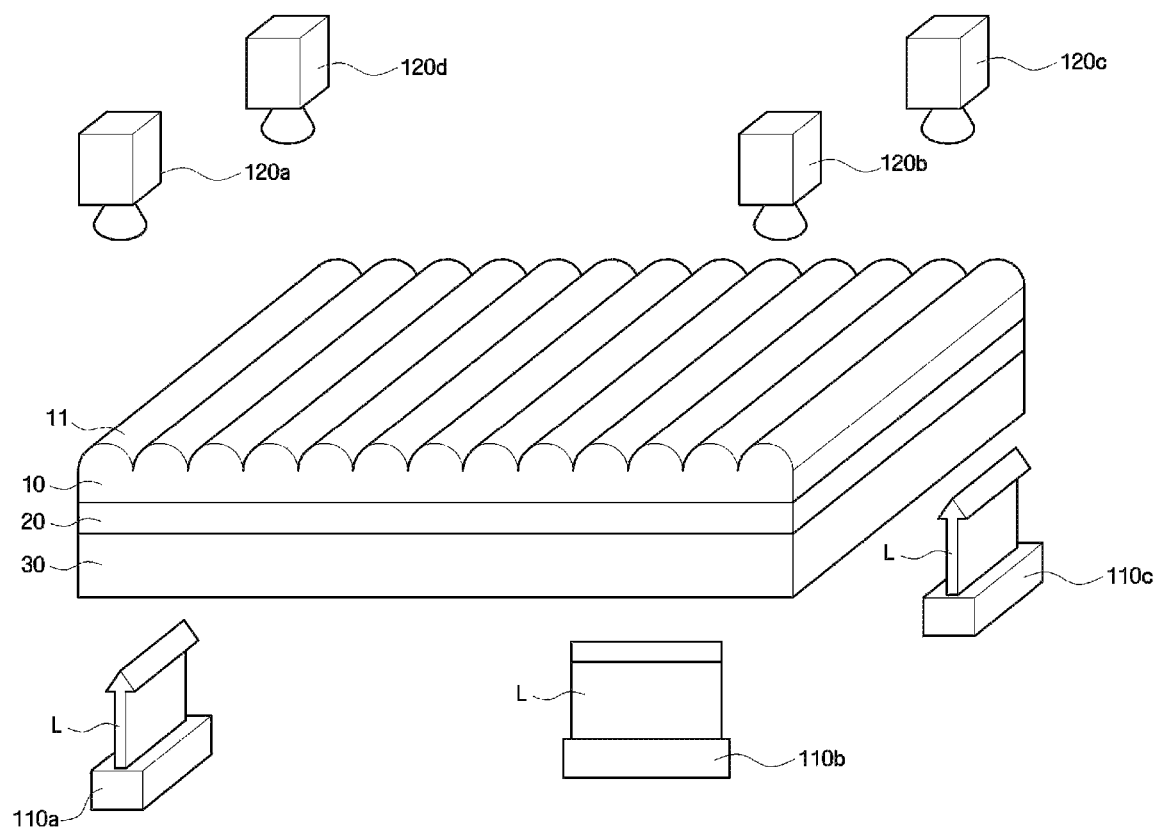
FIG. 3 is a perspective view showing positions of a light source unit and a detection unit of the manufacturing apparatus of the display device shown in FIG. 1.
Figure 4:
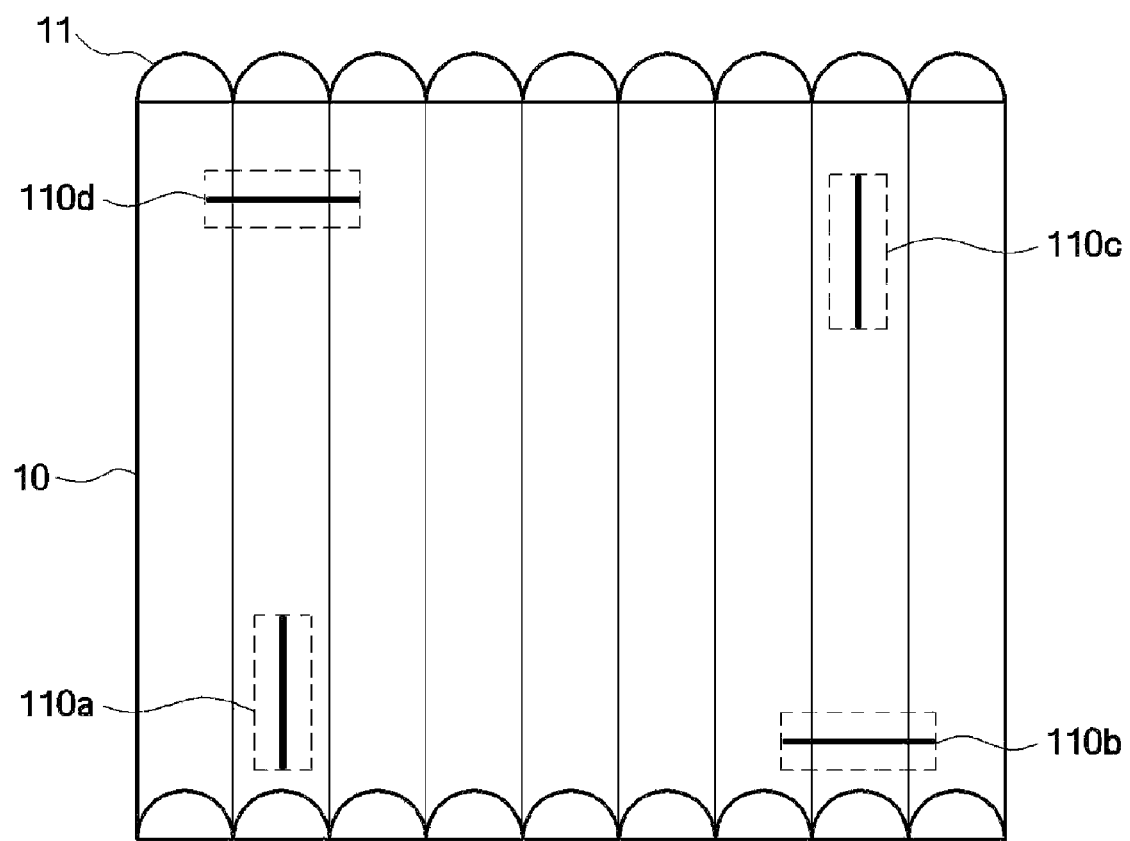
FIG. 4 is a plan view showing how the light source unit is disposed in the manufacturing apparatus of the display device shown in FIG. 1.

First, referring to FIG. 2, FIG. 3, and FIG. 4, the apparatus 100 for manufacturing a display device according to the present exemplary embodiment may be used to precisely align and attach the lenticular sheet 10 on the display panel 20. The apparatus 100 includes a light source unit 110, a detection unit 120, an operation unit 200, a controller 300, a position adjuster 400, and a display 500.

The light source unit 110 is disposed under the display panel 20 and emits parallel light onto the display panel 20 and the lenticular sheet 10. The display panel 20 includes a glass substrate that can transmit light. The lenticular sheet 10 functioning as a lens also transmits light. That is, light emitted from the light source unit 110 is transmitted upward through the display panel 20 and the lenticular sheet 10.

The light source unit 110 may be inserted into a stage S on which the display panel 20 and the lenticular sheet 10 are seated. The stage S may have a throughhole (not shown) formed such that the light source unit 110 emits light from below the stage S.

Light emitted from the light source unit 110 may be parallel light. The parallel light is then focused precisely on a focal plane of the columnar lens 11 and creates a striped image (12 in FIG. 6) along an axial direction of the columnar lens 11. The parallel light makes the striped image 12 uniform so as to accurately determine the axial direction of the columnar lens 11. The detection unit 120 is disposed above the lenticular sheet 10 and recognizes the striped image 12 formed through the lenticular sheet 10. Light rays emitted from the light source unit 110 pass through the display panel 20 and are then focused by the columnar lens 11 on the lenticular sheet 10 to produce striped patterns having a width smaller than that of the original light rays.

Light rays that have passed through the columnar lenses 11 on the lenticular sheet 10 produce striped patterns having a width that varies depending on the distance from the lenticular sheet 10. More specifically, a striped pattern produced by a light ray L near the lenticular sheet 10 has a width slightly smaller than that of the columnar lens 11. A striped pattern produced by the light ray L near a focus of the columnar lens 11 has a minimum width. The detection unit 120 may be disposed in close proximity to the focus of the columnar lens 11. By detecting the striped image 12 at a point in which the striped image 12 has a minimum width, the axial direction of the columnar lens 11 can be determined more precisely.

The operator 200 uses the striped image 12 obtained by the detection unit 120 to calculate the axial direction of the columnar lens 11. The axial direction of the columnar lens 11 becomes the same as the direction in which a striped pattern extends. The operator 200 recognizes the striped image in order to use it as a visual image. Alternatively, the operator 200 may convert the striped image 12 into a vector form and into digital data.

The controller 300 controls the position adjuster 400 so that the axial direction of the columnar lens 11 obtained by the operation unit 200 coincides with a coordinate axis or first alignment mark (21 in FIG. 7A) of the display panel 20. More specifically, the controller 300 applies a control signal to the position adjuster 400 in order to adjust the position between the display panel 20 and the lenticular sheet 10. When the lenticular sheet 10 precisely aligns on the display panel 20, the controller 300 may also apply a control signal to the display 500 so as to display a second alignment mark (13 in FIG. 9A) corresponding to the first alignment mark 21 of the display panel 20.

The position adjuster 400 adjusts the relative position between the display panel 20 and the lenticular sheet 10. The position adjuster 400 adjusts the position of the stage S on which the display panel 20 is seated. For example, the display panel 20 and the lenticular sheet 10 may be aligned with each other by rotating or moving the stage S up/down or left/right while the lenticular sheet 10 remains fixed. For alignment between the display panel 20 and the lenticular sheet 10, the axial direction of the columnar lens 11 is determined before correcting a twist error therebetween. That is, the direction in which the display panel 20 and the lenticular sheet 10 rotate may be aligned by rotating the display panel 20 and the lenticular sheet 10 before x- and y-axis directions are aligned.

Alternatively, the position adjuster 400 may adjust the relative position between the display panel 20 and the lenticular sheet 10 by moving the lenticular sheet 10 while the display panel 20 is fixed onto the stage S.

Alternatively, the position adjuster 400 may adjust the relative position between the display panel 20 and the lenticular sheet 10 by moving the lenticular sheet 10 and adjusting the position of the stage S on which the display panel 20 is seated.

The lenticular sheet 10 can be aligned on the display panel 20 simultaneously with the step of attaching the lenticular sheet 10 onto the display panel 20. The attaching step may be performed by the apparatus 100.

On the other hand, if the aligning and attaching steps are performed by separate devices, a second alignment mark 13 may be formed on the lenticular sheet 10 after aligning the lenticular sheet 10 on the display panel 20. The second alignment mark 13 may be formed on one part of the lenticular sheet 10 which is not corresponding to the pixels 10. The second alignment mark 13 may be formed on several parts of the lenticular sheet 10 which do not correspond to the pixels 10.

The second alignment mark 13 is formed corresponding to the first alignment mark 21. More specifically, the display 500 irradiates the lenticular sheet 10 with a laser beam in order to form a second alignment mark 13. In this way, the second alignment mark 13 on the lenticular sheet 10 corresponds to the first alignment mark 21 on the display panel 20 and serves as a mark for aligning the lenticular sheet 10 with the display panel 20 during a subsequent step of attaching them. A method of manufacturing the display device 1 that involves aligning and attaching the lenticular sheet 10 on the display panel 20 will be described in detail below.

An arrangement relationship between the light source unit 110 and the detection unit 120 will now be described with reference to FIG. 3 and FIG. 4. The light source unit 110 and the detection unit 120 may be disposed between the display panel 20 and the lenticular sheet 10. More specifically, the light source unit 110 is disposed below the display panel 20 while the detection unit 120 is disposed above the lenticular sheet 10.

Referring to FIG. 3 and FIG. 4, the light source unit 110 includes first through fourth light sources 110a, 110b, 110c, and 110d.

The detection unit 120 includes first through fourth detectors 120a, 120b, 120c, and 120d. The light source unit 110 and the detection unit 120 may be disposed at one or more of the four edges of display areas in the display panel 20 and lenticular sheet 10, respectively. In this exemplary embodiment of the present invention, the first through fourth light sources 110a through 110d and the first through fourth detectors 120a through 120d are disposed at the respective edges of the display areas in the display panel 20 and lenticular sheet 10 in order to accurately determine the axial direction of the columnar lenses 11.

The light source unit 110 emits parallel light toward the display panel 20 and the lenticular sheet 10. The parallel light is emitted with a uniform width instead of being diverged or converged with respect to a direction in which it travels. It is desirable to use the light source unit 110 emitting parallel light in order to accurately determine the axial direction of the columnar lens 11 using the striped image (12 in FIG. 6) formed on the lenticular sheet 10. For example, the parallel light may be laser light.

The light source unit 110 may include a plurality of linear light source units, each emitting light through a slit. Light sources 110a through 110d may be disposed at the respective edges of the lenticular sheet so that their slits are perpendicular to each other.

The first and second light sources 110a and 110b have slits that are orthogonal to each other. The first and second detectors 120a and 120b are disposed above the lenticular sheet 10 in a direction perpendicular to the first and second light sources 110a and 110b. Each of the first and second detectors 120a and 120b may include an image sensor.

The third light source 110c has a slit oriented parallel to a slit of the first light source 110a while the fourth light source 110d has a slit oriented parallel to a slit of the second light source 110b. That is, each of the first through fourth light sources 110a through 110d has a slit oriented orthogonal to a slit of a light source adjacent thereto and parallel to a slit of a light source diagonally facing it.

A process of recognizing the striped image 12 in the detection unit 120 is described with reference to FIG. 5 and FIG. 6. As described above, the detection unit 120 is disposed at a position above the lenticular sheet 10 corresponding to the focus of the columnar lens 11.

Parallel light L that is incident from below the display panel 20 and the lenticular sheet 10 passes through the display panel 20 and is refracted from a surface of the columnar lens 11 on the lenticular sheet 10 into the detection unit 120.

Light recognized by the detection unit 120 represents the striped image 12 produced along the axial direction of the columnar lens 11. The striped image 12 emanates brighter light than the light impinging on the surface of the columnar lens 11.

The direction of the striped image 12 is exactly the same as the axial direction of the columnar lens 11. Thus, by aligning the direction of the striped image 12 with the display panel 20, the lenticular sheet 10 can be easily and accurately aligned with the display panel 20.

Figure 7A:
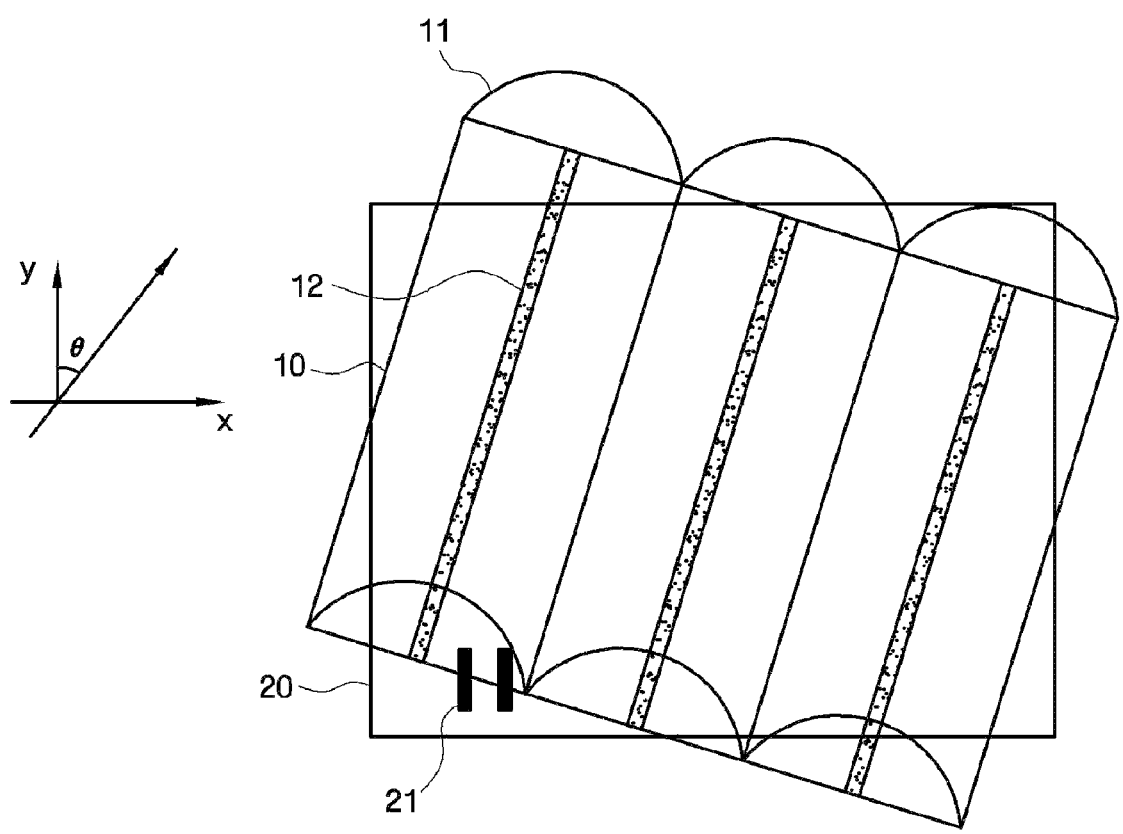
FIG. 7A, FIG. 7B, and FIG. 7C are plan views showing an alignment process of a lenticular sheet and a display panel.
Figure 7B:
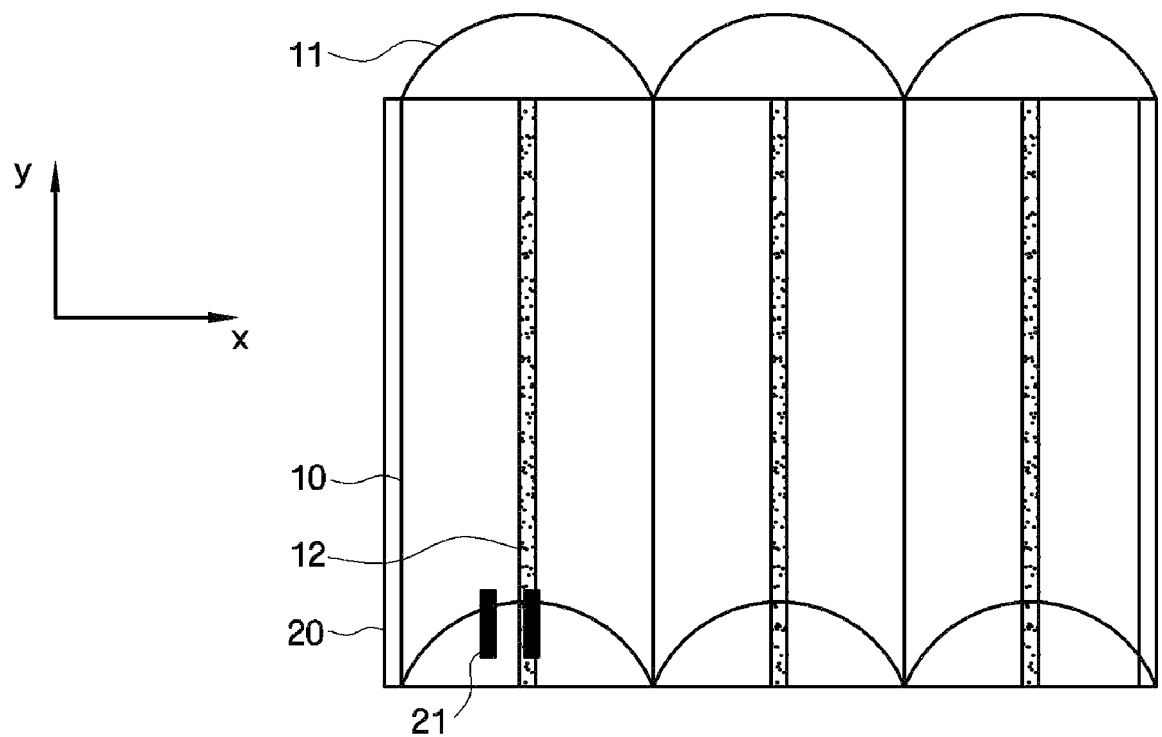
Figure 7C:
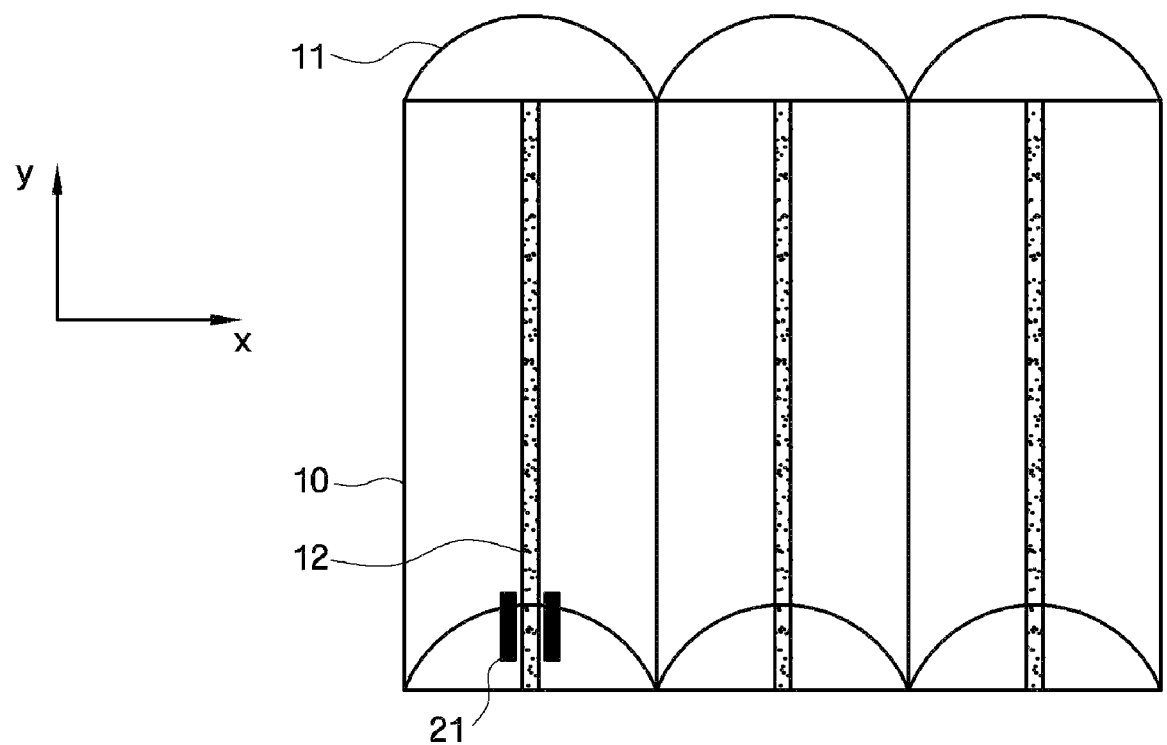

A method of manufacturing a display device according to an exemplary embodiment of the present invention is described in detail with reference to FIG. 7A, FIG. 7B, FIG. 7C, and FIG. 8. FIG. 7A, FIG. 7B, and FIG. 7C are plan views showing an alignment process of a lenticular sheet and a display panel, and FIG. 8 is a flowchart showing a method of manufacturing a display device according to an exemplary embodiment of the present invention.

Figure 8:
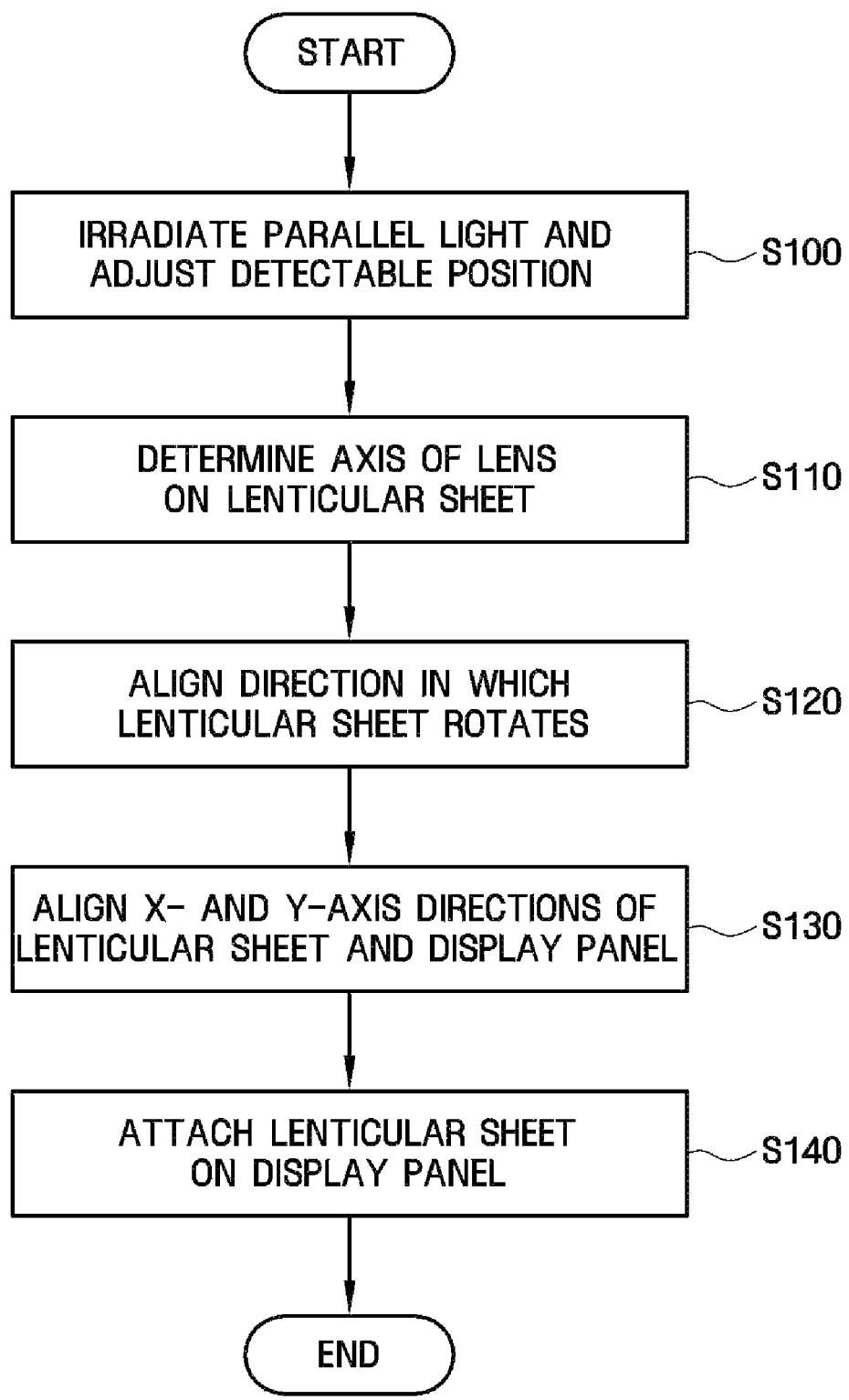
FIG. 8 is a flowchart showing a method of manufacturing a display device according to an exemplary embodiment of the present invention.

First, referring to FIG. 7A and FIG. 8, a lenticular sheet 10 is stacked on a display panel 20. In this case, the lenticular sheet 10 is not precisely aligned with the display panel 20. That is, the display panel 20 and the lenticular sheet 10 are out of line with each other.

Then, parallel light is irradiated onto the display panel 20 and the lenticular sheet 10 in order to adjust a position at which light will be detected (S100).

The display panel 20 includes a first alignment mark 21 that serves as a reference point for alignment with the lenticular sheet 10. The first alignment mark 21 may be formed on a non-display region on the display panel 20. The first alignment mark 21 may be formed during formation of the display panel 20, i.e., during one of mask processes for forming the display panel 20. For example, the first alignment mark 21 may be formed as a gate or data metal during a process wherein a gate line (not shown) or data line (not shown) is formed.

A striped image 12 is formed on the lenticular sheet 10. The lenticular sheet 10 does not require a separate mark corresponding to the first alignment mark 21 since the striped image 12 serves as an alignment mark. Thereafter, the striped image 12 formed by the columnar lens 11 on the lenticular sheet 10 is used to determine an axis of a columnar lens 11 (S110).

Referring to FIG. 7B and FIG. 8, the first alignment mark 21 on the display panel 20 and the striped image 12 on the lenticular sheet 10 are used to align the direction in which the display panel 20 and the lenticular sheet 10 rotate (S120). That is, the display panel 20 and the lenticular sheet 10 have an aligned direction in which they rotate when they are parallel to each other.

The lenticular sheet 10 achieves multiple views in a direction orthogonal to the axial direction of the columnar lens 11, thereby allowing display of a stereoscopic image. Misalignment of the axial direction of the columnar lens 11 may not only degrade a display quality but also cause confusion with a stereoscopic image visible to left and right eyes. Thus, the axial direction of the columnar lens 11 should be precisely aligned for alignment of the lenticular sheet 10 with the display panel 20. The direction in which the display panel 20 and the lenticular sheet 10 rotate can be aligned by precisely aligning the striped image 12 with the first alignment mark 21. More specifically, the detection unit 120 having image sensors can simultaneously detect the first alignment mark 21 and the striped image 12. Thus, it is possible to align the lenticular sheet 10 with the display panel 20 as the detection unit 120 observes in real time the first alignment mark 21 and the striped image 12. That is, precise alignment between the first alignment mark 21 and the striped image 12 is achieved by performing feedback control on the position of the lenticular sheet 10 and the display panel 20 as the detection unit 120 recognizes the striped image 12 in real time.

Referring to FIG. 7C and FIG. 8, the first alignment mark 21 on the display panel 20 and the striped image 12 on the lenticular sheet 10 are then used to align the x- and y-axis directions of the display panel 20 and the lenticular sheet 10 (S130).

That is, after aligning the direction of arrangement between axes of the columnar lenses 11 and pixels PXs by aligning the direction in which the display panel 20 and the lenticular sheet 10 rotate, x- and y-axis directions of the display panel 20 and the lenticular sheet 10 are precisely aligned.

In particular, the x-axis direction of the display panel 20 and the lenticular sheet 10 should be aligned more precisely than the y-axis direction thereof. For example, in a seven (7) multi-view display device, one columnar lens 11 superimposes 7 pixels representing one dot in a direction orthogonal to the axis of the columnar lens 11. The 7 pixels represent different views, only one of which is visible to an observer. Thus, a group of 7 pixels representing one dot should be precisely superimposed on each columnar lens 11 in the direction orthogonal to the axial direction of the columnar lens 11. If a group of 7 pixels representing one dot and some of the pixels used to represent an adjacent dot are superimposed together on the columnar lens 11 corresponding to the group of 7 pixels representing the dot, images observed by left and right eyes may be fused with images of different views represented the pixels in the adjacent group. Mixing the images observed by left and right eyes with the images in the adjacent group may not only degrade the quality of a stereoscopic image but also make the observer dizzy.

According to the method of manufacturing a display device according to the present exemplary embodiment, the x-axis direction of the display panel 20 and the lenticular sheet 10 can be precisely aligned using the first alignment mark 21 on the display panel 20 and the striped image 12 formed by the columnar lens 11, thereby preventing mixture of images represented by an adjacent group of pixels into images observed by left and right eyes.

Following the alignment of the x-axis direction of the display panel 20 and the lenticular sheet 10, the first alignment mark 21 and the striped image 12 are used to align the y-axis direction of the display panel 20 and the lenticular sheet 10. The first alignment mark 21 and the striped image 12 are not necessarily used for alignment of the y-axis direction. That is, the columnar lens 11 creates a series of the same view images in the axial direction thereof. Further, left-eye and right-eye images are not likely to mix with each other because there is no boundary in the axial direction. Thus, the axial direction of the columnar lens 11 may be aligned using the striped image 12 and any position coordinates in the display panel 20.

Upon completing the alignment between the display panel 20 and the lenticular sheet 10, the lenticular sheet 10 is mounted to the display panel 20, thereby completing a display device (S140).

A method of manufacturing a display device according to another exemplary embodiment of the present invention is described in detail with reference to FIG. 7A, FIG. 7B, FIG. 7C, FIG. 9A, FIG. 9B, FIG. 9C, FIG. 9D, and FIG. 10. FIG. 9A, FIG. 9B, FIG. 9C, and FIG. 9D are plan views showing a method of manufacturing a display device according to another exemplary embodiment of the present invention, and FIG. 10 is a flowchart showing a method of manufacturing a display device according to another exemplary embodiment of the present invention. For convenience of explanation, the same steps as described in the method according to the previous exemplary embodiment are described with reference to FIG. 7A, FIG. 7B, and FIG. 7C. The same elements as those in FIG. 7A, FIG. 7B, and FIG. 7C are denoted by the same reference numerals and a detailed explanation thereof will not be given.

The feature of the method according to the present exemplary embodiment is that alignment of the lenticular sheet 10 with the display panel 20 and forming an alignment mark is performed separately from attaching the lenticular sheet 10 to the display panel 20. If the alignment and attaching steps are performed by the same equipment so the equipment becomes bulky, the steps may be performed by separate equipment as in the present exemplary embodiment.

First, referring to FIG. 7A and FIG. 10, the lenticular sheet 10 is stacked on the display panel 20. Then, parallel light is irradiated onto the display panel 20 and the lenticular sheet 10 and a position at which light will be detected is adjusted (S200).

The striped image 12 formed by the columnar lens 11 on the lenticular sheet 10 is then used to determine an axis of the columnar lens 11 (S210).

Referring to FIG. 7B and FIG. 10, the first alignment mark 21 on the display panel 20 and the striped image 12 on the lenticular sheet 10 are used to align the direction in which the display panel 20 and the lenticular sheet 10 rotate (S220).

Referring to FIG. 7C and FIG. 10, the first alignment mark 21 on the display panel 20 and the striped image 12 on the lenticular sheet 10 are then used to align the x- and y-axis directions of the display panel 20 and the lenticular sheet 10 (S230).

Figure 9A:
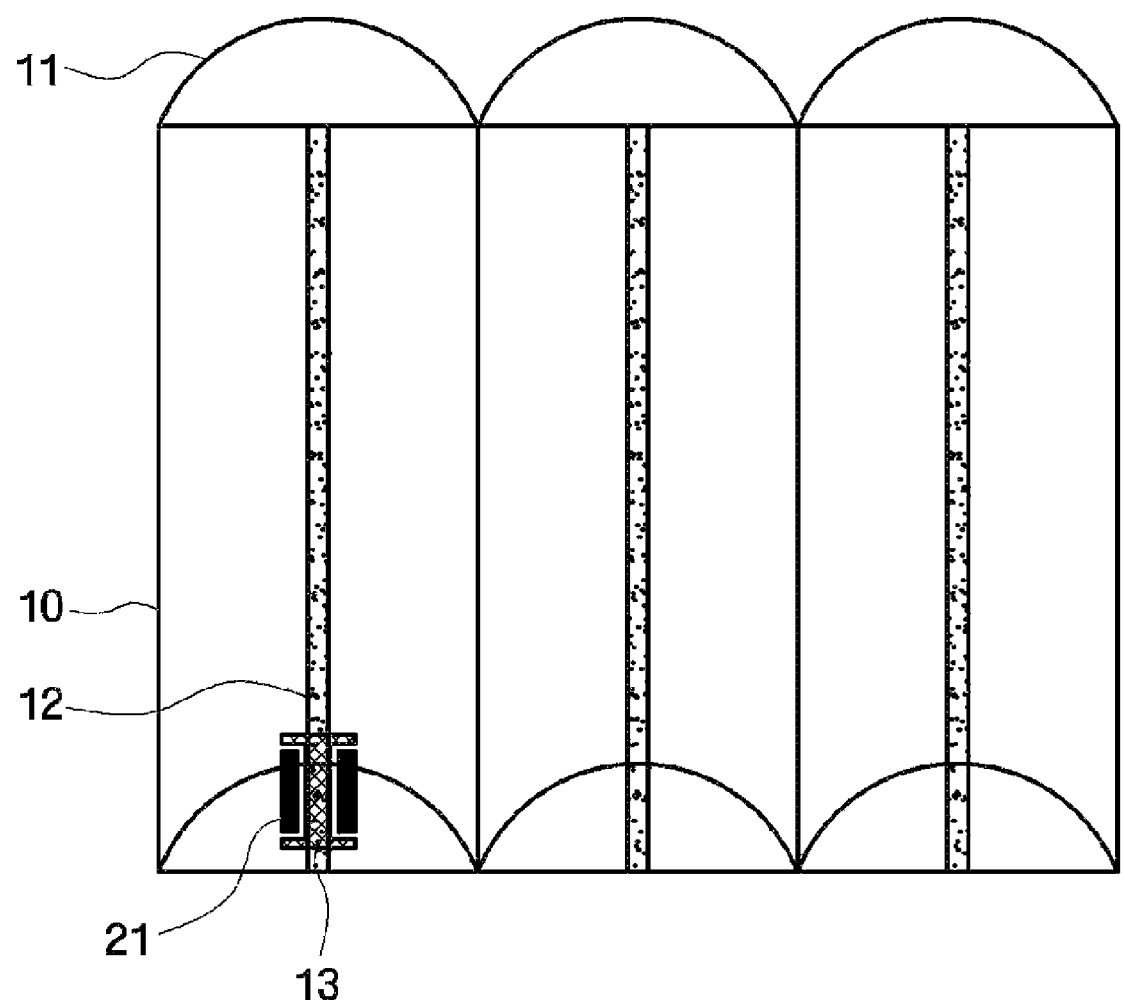
FIG. 9A, FIG. 9B, FIG. 9C, and FIG. 9D are plan views showing a method of manufacturing a display device according to another exemplary embodiment of the present invention.
Figure 10:
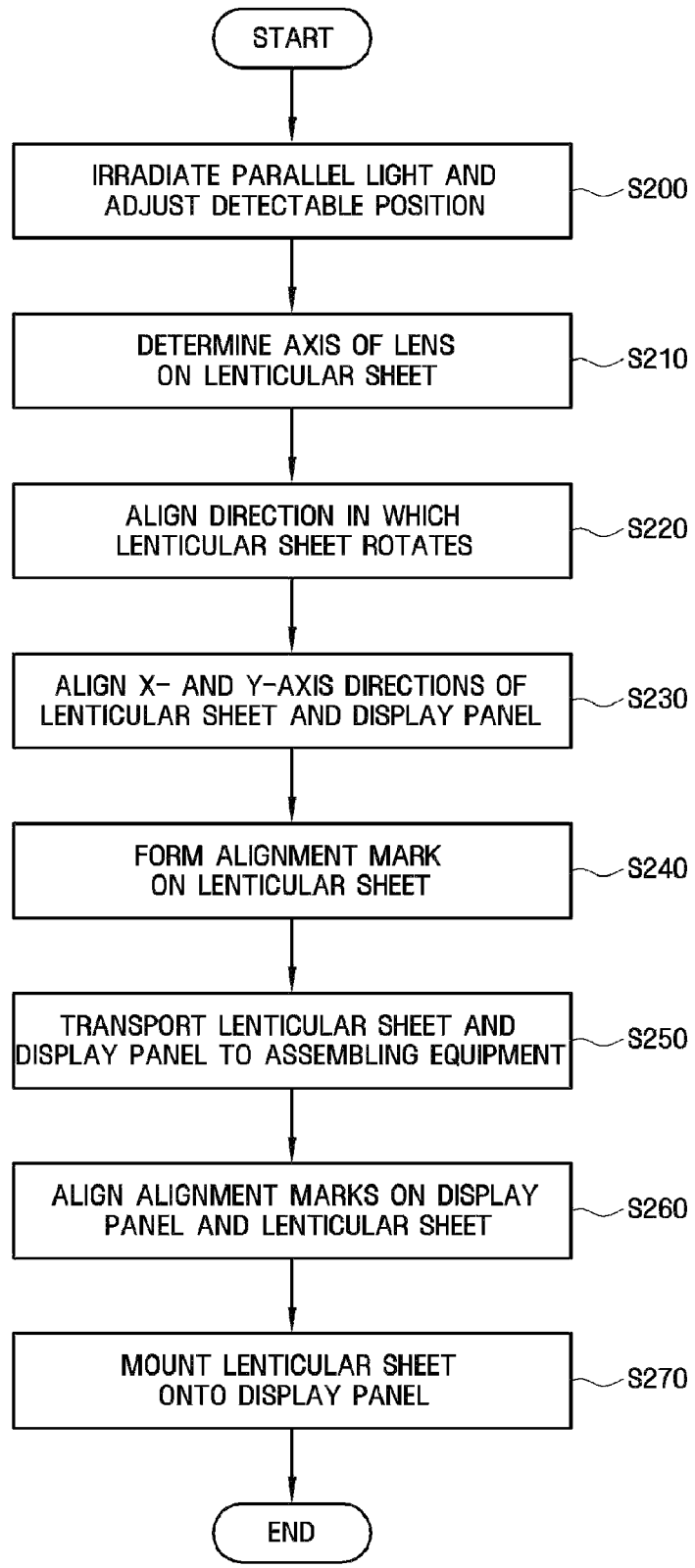
FIG. 10 is a flowchart showing a method of manufacturing a display device according to another exemplary embodiment of the present invention.

Referring to FIG. 9A and FIG. 10, a second alignment mark 13 is subsequently formed on the lenticular sheet 10 (S240). More specifically, if aligning and attaching the lenticular sheet 10 on the display panel 20 are not performed by the same equipment, it is necessary to form a separate alignment mark in order to easily realign the lenticular sheet 10 on the display panel 20.

As described above, the first alignment mark 21 has been previously formed on the display panel 20 during manufacturing of the display panel 20. The second alignment mark 13 is formed at a position on the lenticular sheet 10 corresponding to the first alignment mark 21. The first and second alignment marks 21 and 13 may have any shape as long as it can precisely determine the relative position between the display panel 20 and the lenticular sheet 10 and correctly align them. For example, the first and second alignment marks 21 and 13 may be combined into a single figure. As shown in FIG. 9A, the first alignment mark 21 may be two short stripes representing two sides of a rectangle while the second alignment mark 13 may be an I-shaped character disposed between the two short stripes. The first and second alignment marks 21 and 13 are combined into a rectangular shape.

The second alignment mark 13 may be formed at any position on the lenticular sheet 10 using laser light. For example, the second alignment mark 13 may be formed on an axis of the columnar lens 11 or at four edges of the lenticular sheet 10 where an image can be detected.

Figure 9B:
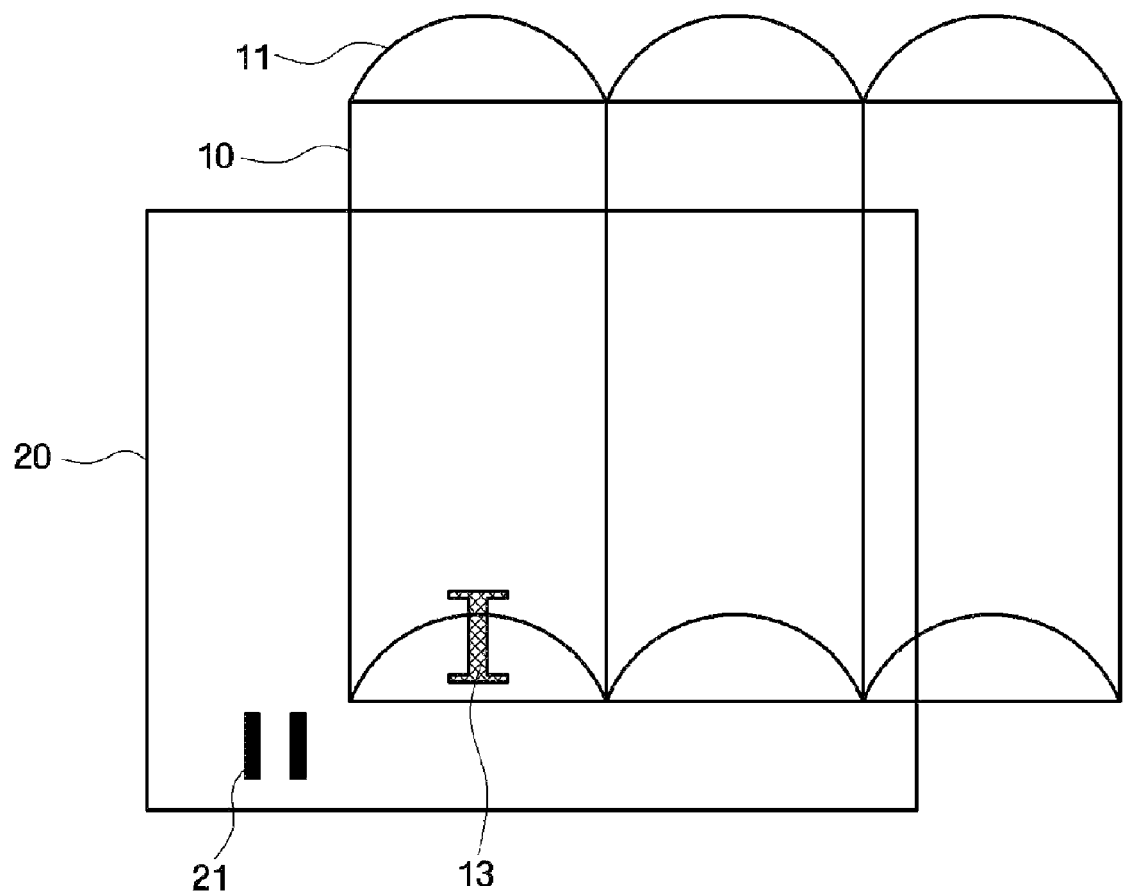

Referring to FIG. 9B, after forming the second alignment mark 13 on the lenticular sheet 10, the lenticular sheet 10 and the display panel 20 are separated from each other and subsequently transported to assembling equipment (S250).

During transporting to the assembling equipment, as illustrated in FIG. 9B, the lenticular sheet 10 may be misaligned with the display panel 20. The lenticular sheet 10 and the display panel 20 may be transported together or separately when necessary.

Figure 9C:
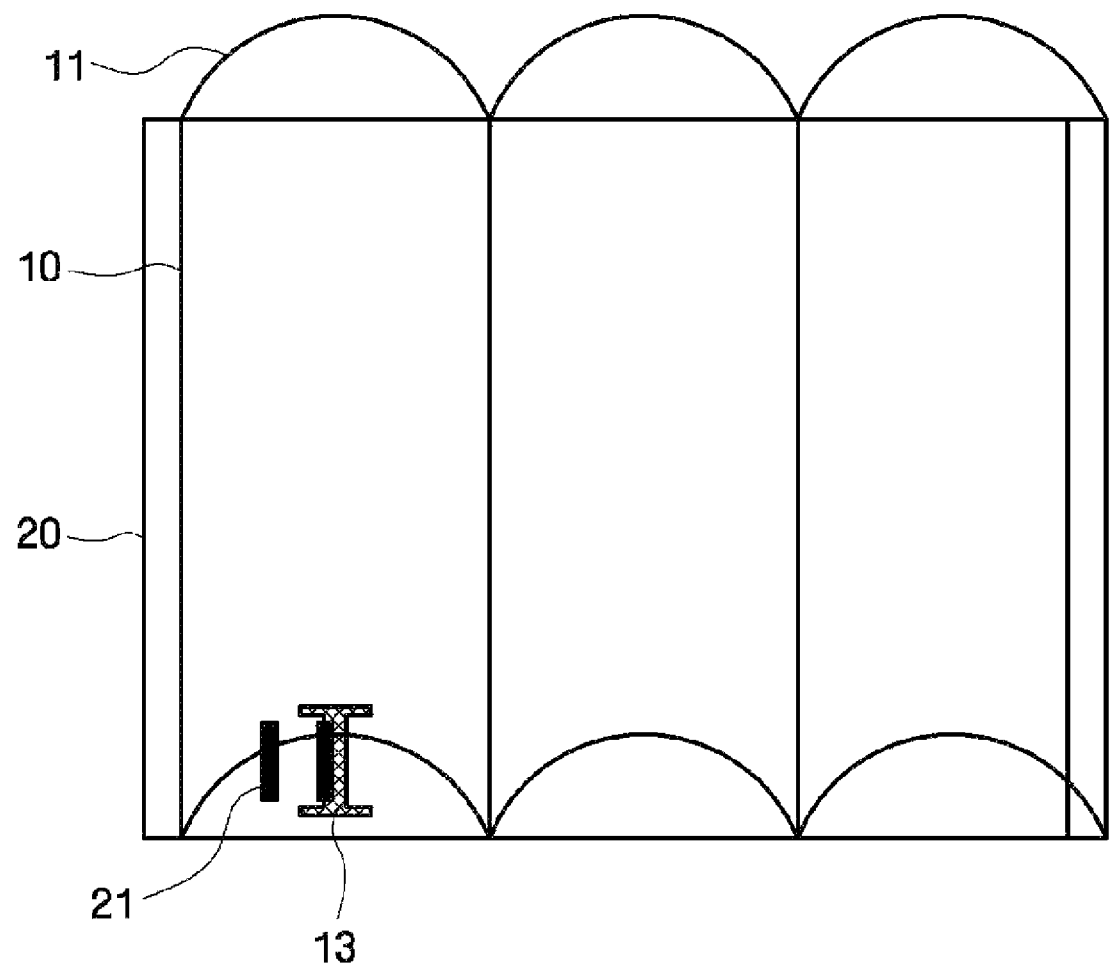

Referring to FIG. 9C and FIG. 10, after being transported to the assembling equipment, the lenticular sheet 10 is realigned on the display panel 20 (S260).

More specifically, since the lenticular sheet 10 is out of line with the display panel 20 during transport, it is necessary to realign them. During realignment between the lenticular sheet 10 and the display panel 20, the step of irradiating parallel light on the display panel 20 and the lenticular sheet 10 and determining an axis of the columnar lens 11 may be skipped.

For realignment of the lenticular sheet 10 on the display panel 20, images of the first alignment mark 21 on the display panel 20 and the second alignment mark 13 on the lenticular sheet 10 are detected to align the first and second alignment marks 21 and 13.

Only images of the first and second alignment marks 21 and 13 are recognized for alignment of the lenticular sheet 10 with the display panel 20 through real-time feedback.

Figure 9D:
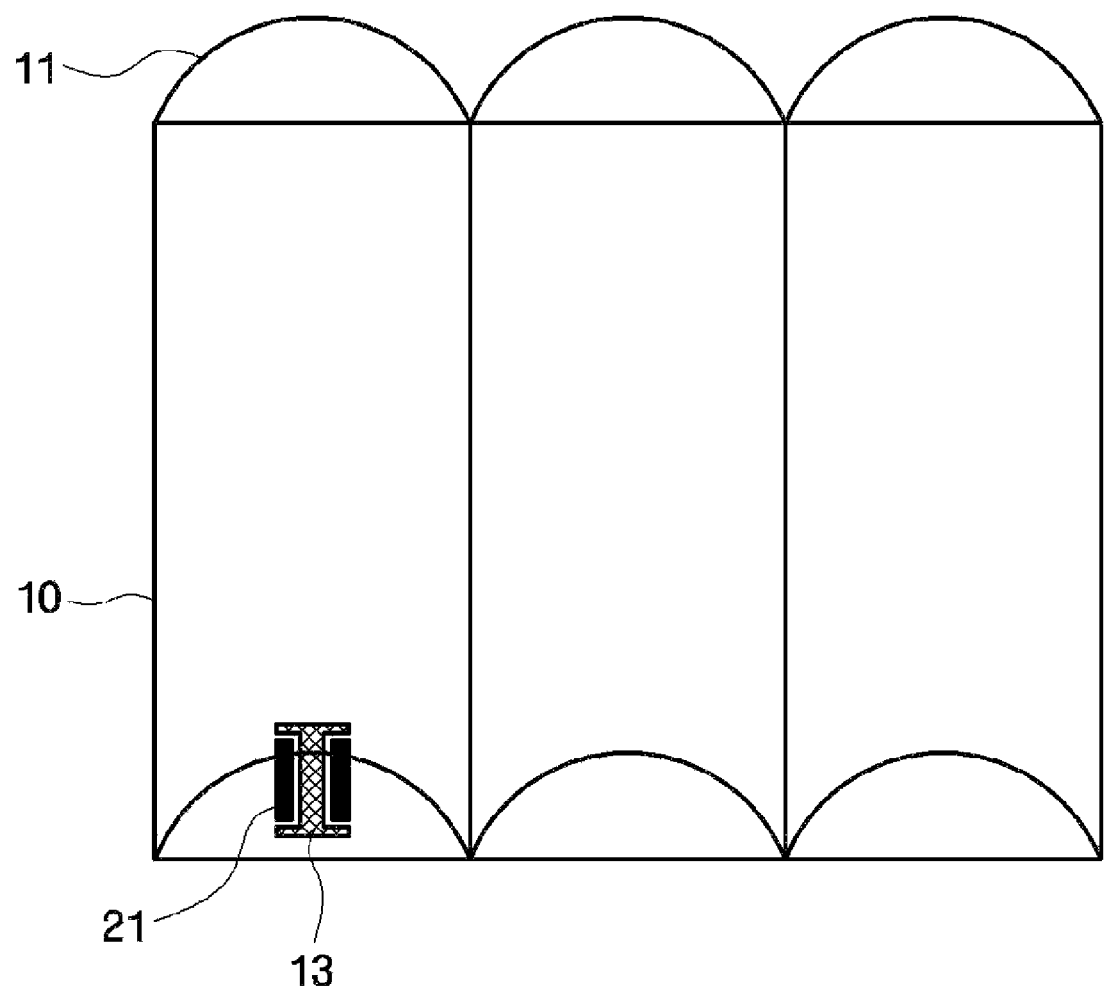

Lastly, referring to FIG. 9D and FIG. 10, the lenticular sheet 10 is attached onto the display panel 20 (S270).

More specifically, upon alignment of the first and second alignment marks 21 and 13, the lenticular sheet 10 is precisely aligned on the display panel 20. After realignment of the display panel 20 and the lenticular sheet 10, the lenticular sheet 10 is mounted onto the display panel 20, thereby completing the display device 1 according to the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a display device, the method comprising:
    disposing a display panel and a lenticular sheet on a stage;
    irradiating light toward the display panel and the lenticular sheet from a side of the display panel opposite the lenticular sheet, the light being incident toward the display panel and the lenticular sheet as parallel light;
    detecting the light that has passed through the display panel and the lenticular sheet; and
    determining an axial direction of a columnar lens formed on the lenticular sheet based on the detected light.

2. The method of claim 1, wherein detecting the light comprises detecting an image of a striped pattern, the striped pattern being formed by light passing through and being focused by the columnar lens.

3. The method of claim 2, wherein a direction of the striped pattern determines the axial direction of the columnar lens.

4. The method of claim 1, further comprising, after the determining of the axial direction of the columnar lens, adjusting the position of at least one of the display panel and the lenticular sheet.

5. The method of claim 4, wherein the display panel comprises a first alignment mark, and wherein adjusting the position of the at least one of the display panel and the lenticular sheet comprises aligning the first alignment mark with the axial direction of the columnar lens.

6. The method of claim 5, wherein adjusting the position of the at least one of the display panel and the lenticular sheet comprises rotating at least one of the display panel and the lenticular sheet so that the axial direction of the columnar lens becomes the same as the direction in which the first alignment mark extends.

7. The method of claim 5, further comprising forming a second alignment mark on the lenticular sheet corresponding to the first alignment mark.

8. The method of claim 7, wherein forming the second alignment mark comprises irradiating a laser on the lenticular sheet.

9. The method of claim 7, further comprising:
aligning the first alignment mark and the second alignment mark; and
coupling the lenticular sheet and the display panel together.

10. An apparatus for manufacturing a display device, the apparatus comprising:
a stage configured to seat a display panel and a lenticular sheet;
a light source unit configured to emit parallel light toward the display panel and the lenticular sheet from a side of the display panel opposite the lenticular sheet;
a detection unit disposed above the lenticular sheet and configured to detect the light that passes through the display panel and the lenticular sheet; and
an operation unit configured to receive data from the detection unit and to determine an axial direction of a columnar lens arranged on the lenticular sheet.

11. The apparatus of claim 10, wherein the detection unit is disposed at a focal position of the columnar lens.

12. The apparatus of claim 10, wherein the light is focused by the columnar lens to obtain a striped pattern, and the detection unit is configured to recognize an image of the striped pattern.

13. The apparatus of claim 12, wherein the operation unit equates the direction of the striped pattern as the axial direction of the columnar lens.

14. The apparatus of claim 10, wherein the light source unit comprises a linear light source unit.

15. The apparatus of claim 10, wherein the light source unit comprises a laser light source unit.

16. The apparatus of claim 10, wherein the light source unit is configured to emit the light onto at least one of four edges of display area in the display panel and onto at least one of four edges of the lenticular sheet.

17. The apparatus of claim 10, further comprising a position adjuster configured to adjust the position of at least one of the display panel and the lenticular sheet according to the result obtained by the operation unit.

18. The apparatus of claim 17, wherein the display panel comprises a first alignment mark, and the position adjuster aligns the first alignment mark with the axial direction of the columnar lens.

19. The apparatus of claim 18, wherein the position adjuster is configured to rotate at least one of the display panel and the lenticular sheet so that the axial direction of the columnar lens is the same direction in which the first alignment mark extends.

20. The apparatus of claim 18, further comprising a display configured to form a second alignment mark on the lenticular sheet, the second alignment mark corresponding to the first alignment mark.

* * * * *